US011205176B2

(12) United States Patent
Jinks et al.

(10) Patent No.: US 11,205,176 B2
(45) Date of Patent: Dec. 21, 2021

(54) METHODS AND SYSTEMS FOR AUTHORIZING PROGRAM ACTIVITIES

(71) Applicant: Total System Services, Inc., Columbus, GA (US)

(72) Inventors: Trey Jinks, Columbus, GA (US); Ruben Flores, Acworth, GA (US)

(73) Assignee: TOTAL SYSTEM SERVICES, INC., Columbus, GA (US)

( * ) Notice: Subject to any disclaimer, the term of this patent is extended or adjusted under 35 U.S.C. 154(b) by 871 days.

(21) Appl. No.: 14/876,275

(22) Filed: Oct. 6, 2015

(65) Prior Publication Data

US 2016/0098714 A1    Apr. 7, 2016

Related U.S. Application Data

(60) Provisional application No. 62/060,259, filed on Oct. 6, 2014.

(51) Int. Cl.
*G06Q 30/00* (2012.01)
*G06Q 20/40* (2012.01)
*G06Q 30/06* (2012.01)

(52) U.S. Cl.
CPC ......... *G06Q 20/401* (2013.01); *G06Q 20/405* (2013.01); *G06Q 30/0609* (2013.01)

(58) Field of Classification Search
CPC . G06Q 20/401; G06Q 20/405; G06Q 30/0609
USPC .............................. 705/26.35, 26, 27, 35, 36
See application file for complete search history.

(56) References Cited

U.S. PATENT DOCUMENTS

| | | | | |
|---|---|---|---|---|
| 9,760,871 | B1* | 9/2017 | Pourfallah | G06Q 20/3276 |
| 10,115,087 | B2* | 10/2018 | Pourfallah | G06Q 20/223 |
| 2003/0110136 | A1* | 6/2003 | Wells | G06Q 40/12 |
| | | | | 705/64 |
| 2003/0233278 | A1* | 12/2003 | Marshall | G06Q 30/0212 |
| | | | | 705/14.35 |
| 2005/0205662 | A1* | 9/2005 | Nelson | G06Q 20/12 |
| | | | | 235/380 |

(Continued)

FOREIGN PATENT DOCUMENTS

WO    WO-02065246 A2 *  8/2002  ............. G06Q 20/04

OTHER PUBLICATIONS

Visa USA Inc Files Patent Application for Auto Substantiation for Healthcare Upon Sponsor Account Through Payment Processing System Indian Patents News [New Delhi] Apr. 27, 2013; Dialog #1346347503 2pgs. (Year: 2013).*

*Primary Examiner* — Robert M Pond
(74) *Attorney, Agent, or Firm* — Ballard Spahr LLP

(57) ABSTRACT

Methods and systems are disclosed for processing information. An example method can comprise receiving a request to authorize an operation. The request can comprise a product identifier and an account identifier. The method can further comprise determining authorization plan data associated with the account identifier. The authorization plan data comprises a collection of product identifiers indicating products authorized by a sponsor. The method can comprise determining whether the transaction is authorized based on a comparison of the product identifier to at least a portion of the collection of product identifiers and providing an authorization message in response to the determining whether the transaction is authorized.

20 Claims, 10 Drawing Sheets

(56) References Cited

U.S. PATENT DOCUMENTS

| | | | | |
|---|---|---|---|---|
| 2006/0053056 | A1* | 3/2006 | Alspach-Goss | G06Q 20/10 705/14.17 |
| 2009/0177563 | A1* | 7/2009 | Bernstein | G06Q 40/02 705/30 |
| 2011/0125645 | A1* | 5/2011 | Benkert | G06Q 20/04 705/44 |
| 2011/0166872 | A1* | 7/2011 | Cervenka | G06Q 20/20 705/2 |
| 2014/0032237 | A1* | 1/2014 | Patricelli | G06Q 20/10 705/2 |
| 2014/0297307 | A1* | 10/2014 | Pletz | G06F 19/328 705/2 |
| 2015/0106260 | A1* | 4/2015 | Andrews | G06Q 20/4016 705/39 |
| 2016/0019529 | A1* | 1/2016 | Wang | G06K 9/3258 705/41 |
| 2018/0025334 | A1* | 1/2018 | Pourfallah | G06Q 20/02 705/4 |

* cited by examiner

METHODS AND SYSTEMS FOR AUTHORIZING PROGRAM ACTIVITIES

CROSS REFERENCE TO RELATED PATENT APPLICATION

This application claims priority to U.S. Provisional Application No. 62/060,259 filed Oct. 6, 2014, herein incorporated by reference in its entirety.

SUMMARY

It is to be understood that both the following general description and the following detailed description are exemplary and explanatory only and are not restrictive, as claimed. Provided are methods and systems for processing information and managing an authorization program. An example method can comprise receiving a request to authorize an operation. The request can comprise a product identifier and an account identifier. The method can further comprise determining authorization plan data associated with the account identifier. The authorization plan data can comprise a collection of product identifiers indicating products authorized by a sponsor. The method can comprise determining whether the transaction is authorized based on a comparison of the product identifier to at least a portion of the collection of product identifiers and providing an authorization message in response to the determining whether the transaction is authorized.

In another aspect, an example method can comprise receiving authorization plan data comprising a collection of product identifiers associated with a program identifier, associating the authorization plan data with a participant identifier, and receiving a request to authorize a transaction. The request can comprise the product identifier and the participant identifier. The method can comprise determining to authorize the request based on whether the product identifier is a member of the collection of product identifiers and providing an authorization message via the open loop payment network in response to the request.

In another aspect, an example system can comprise a memory having encoded thereon computer-executable instructions and a processor functionally coupled to the memory and configured, by the computer-executable instructions, to perform at least the following actions: receiving a request to authorize a transaction and determining authorization plan data associated with the account identifier. The request can comprise a product identifier and an account identifier. The authorization plan data can comprise a collection of product identifiers indicating products authorized by a sponsor. The processor can further be configured for determining whether the transaction is authorized based on a comparison of the product identifier to at least a portion of the collection of product identifiers and providing an authorization message in response to the determining whether the transaction is authorized.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
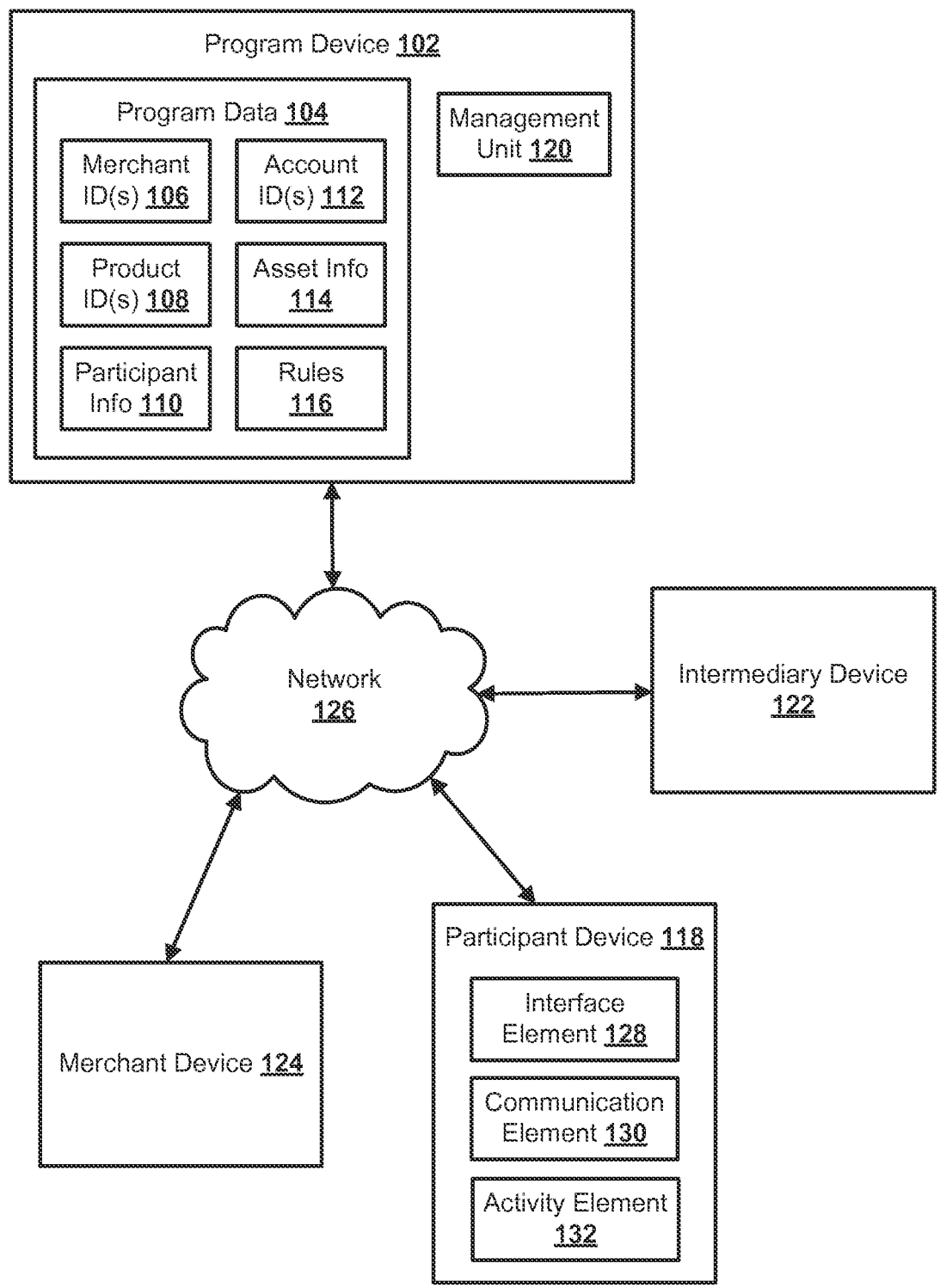
FIG. 1 is a block diagram illustrating an example system for processing data.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to automated transaction authentication to be able to validate and auto-substantiate payment card transactions for products and services eligible via a sponsored program. For example, a sponsor can incentivize or otherwise control (e.g., subsidize) activities and behavior of participants by creating a catalog of products and rewards. Sub-accounts of the same payment card can be established to create separate purses for satisfying transactions from a variety of catalogs or sponsors.

FIG. 1 is a block diagram illustrating an example system 100 for processing data. The system 100 can comprise a program device 102 configured for managing one or more programs. For example, a program can comprise a wellness program (e.g., for a health plan, managed by a medical insurance company), a supplies program (e.g., office supplies), a corporate or family services and/or products program, and/or the like. An example program can be associated with and/or managed by a sponsor. The sponsor can comprise a business, guardian (e.g., parent), institution (e.g., government, school, university), and/or the like. A sponsor can comprise an individual, corporation, employer, business, governmental agency, municipality, partnership, insurance company, parent, co-operative or its agent that is responsible for paying for a participant's items and is liable for authorized purchases that participant makes. The program can be designed to control assets related to participants (e.g., employees, members, enrollees, children, students) of the program. An asset can comprise an item having an associated value (e.g., exchange value). An example asset can comprise currency, a voucher, a coupon, a promise to pay, a link to an account, and/or the like. An account can comprise a collection of one or more sub-accounts.

In an aspect, the program device 102 can comprise program data 104 for management and implementation of one or more programs. The program data 104 can comprise information related to a program. For example, the program data 104 can comprise one or more (e.g., a collection of) merchant identifiers 106. A merchant can comprise any entity offering a product and/or service for purchase. The collection of merchant identifiers 106 can comprise identifiers for business chains, individual locations of a chain, categories of merchants (e.g., health, food, office supplier, book store), terminals (e.g., transaction terminal of a specific merchant, identifying a sub-merchant) and/or the like.

The program data 104 can comprise one or more product identifiers 108. The product identifiers 108 can identify specific products, types of products, categories of products, brand name of products, and/or the like. For example, the product identifiers 108 can identify what section (e.g., fruits, vegetables, meats, dairy, dessert, bread) a product might be located in a store or the particular department in the store (e.g., men's clothing, appliances, housewares).

In an aspect, the program data 104 can comprise one or more participant information 110. The participant information 110 can comprise one or more participant identifiers. The participant identifiers can represent specific individuals, business, institutions, and/or other entities. The participant identifiers can identify an employee of the sponsor, a participant member of an insurance plan (e.g., health insurance, life insurance, car insurance). The participant identifiers can identify dependents (e.g., children) of the sponsor, students of the sponsor, and/or the like.

In another aspect, the participant information 110 can comprise participant activity information. For example, activities, behaviors, purchases, events associated with corresponding participant identifiers can be stored in the program data 104. For example, the participants can voluntarily report participant activity information. Participant activity information can be detected, reported, and/or received from a participant device 118. As explained further herein, the participant device 118 can comprise a smart device (e.g., smart phone, smart apparel, smart glasses, smart watch), an activity tracker (e.g., electronic bracelet, health sensor). The participant device 118 can comprise a payment device, such as payment card. The payment device can comprise a magnetic strip, microchip, transmitter, and/or the like for providing information (e.g., payment information, participant information, program information) For example, the participant device 118 can report activities (e.g., running, walking), food consumption data, sleep information, purchase information, and/or the like.

In an aspect, the program data 104 can comprise one or more account identifiers 112. The account identifiers 112 can identify banking accounts, card accounts, sub-accounts (e.g., account purse), and/or the like. For example, a participant may have an account for holding assets (e.g., currencies). An example account can comprise one or more sub-accounts associated with different categories, rules, funds, and/or the like. The account identifiers 112 can identify accounts of the sponsor, merchants, and/or participants.

In an aspect, the program data 104 can comprise asset information 114. The asset information 114 can identify funds, a specific item or set of items (e.g., voucher for an item), discounts (e.g., coupons), promises, and/or the like associated with a program. The asset information 114 can be related to assets of the sponsor, assets associated with participants, and/or the like.

In an aspect, the program data 104 can comprise one or more rules 116. The rules 116 can be defined, specified, and/or the like by the sponsor. The rules 116 can comprise conditions, such as qualification conditions. For example, the qualification conditions can comprise conditions for receiving an asset. The qualification conditions can be configured to incentivize behavior such as eating habits, active lifestyle, spending habits, study habits, purchasing from specific vendors, traveling to specific locations (e.g., merchant stores), watching advertisements, participating in events (e.g., political event, community service), and/or the like. For example, the rules 116 can associate qualification conditions with assets. The rules 116 can specify specific assets that are associated with satisfaction of corresponding qualification conditions. The rules 116 can specify events (e.g., reward event, funding of asset, placement of asset, granting of a permission) triggered by the conditions. An example rule 116 can specify that an asset is transferred to or otherwise associated with an account. The rules 116 can specify transferring of the asset to a specific account, sub-account, and/or the like. For example, when a participant performs an action that satisfies a condition, then funds can be transferred to a sub-account, a voucher or coupon can be associated with the sub-account, and/or the like. The sub-account can be an electronic purse of an account. The sub-account can have a balance or sub-balance that is separate from the account.

In an aspect, the rules 116 can comprise redemption conditions (e.g., purchase condition, account conditions, sub-account conditions). For example, a purchase condition can specify a merchant, product category, product identifier and/or the need to redeem an asset (e.g., current, reward, voucher, coupon). The redemption conditions can be specified (e.g., defined, selected) by the sponsor. Redemption conditions can comprise conditions for redeeming or otherwise using an asset transferred to and/or associated with a participant identifier. Redemption conditions can specify limitations for using funds from a sub-account. For example, the redemption conditions can specify that an asset can only be used for a product or service associated with a specific product identifier (e.g., unique product, category of products, brand of products). The redemption conditions can specify that an asset can only be redeemed at a merchant associated with a specific merchant identifier (e.g., unique merchant, merchant chain, grocery store, health care provider).

In an aspect, the program device 102 can comprise a management unit 120. The management unit 120 can be configured to provide a sponsor interface to a sponsor for managing the program data 104. For example, the management unit 120 can provide data for a web based or other application based interface. The management unit 120 can schedule events (e.g., transferring assets), send messages (e.g., to transfer assets) to remote devices, analyze trends in changes in the program data 104, and/or the like. The management unit 120 can publish program information. For example, new programs or updates to programs can be published (e.g., emailed) to addresses associated with participant identifiers. The management unit 120 can provide a participant interface for participants to opt-in and/or opt-out of programs for one or more sponsors. The management unit 120 can provide a merchant interface for allowing merchants to provide product information (e.g., product identifiers 108) related to programs. For example, the merchants can provide one or more product identifiers 108 that satisfy reward conditions associated with a program.

In an aspect, the management unit 120 can be configured to receive and process requests from remote devices, such as the intermediary device 122 or the merchant device 124. An example, the management unit 120 can be configured to receive and process authorization requests. An authorization request can comprise a request for authorization of a transaction. The request can comprise a participant identifier, merchant identifier, product identifier, account identifier, and/or the like. The management unit 120 can process (e.g., deny or authorize) the request based on the program data 104, such as the rules 116. For example, the management unit 120 can determine one or more programs (e.g., program identifiers) associated with a participant identifier, one or more programs associated with a merchant identifier, one or more programs associated with a product identifier, and/or the like.

The management unit 120 can determine one or more rules 116 associated with the one or more programs. For example, management unit 120 can determine one or more redemption conditions, asset information 114, and/or the like. If the redemption conditions are satisfied, then the management unit 120 can send an authorization message in response to the authorization request. The authorization message can authorize redemption or use of an asset (e.g., associated with participant identifier). The authorization message can comprise information identifying an account of the sponsor, an account or sub-account associated with the account identifier or participant identifier. The authorization message can indicate an authorized asset value, such as a monetary value (e.g., value of the asset), a percentage of a transaction price, and/or the like. The management unit 120 can store a record of transaction in the participant information 110. As an example, the management unit 120 can authorize transfer for an amount of funds from an account or sub-account.

The system 100 can comprise a network 126. In one aspect, the network 126 can comprise a packet switched network (e.g., internet protocol based network), a non-packet switched network (e.g., circuit switched network), and/or the like. The network 126 can comprise network adapters, switches, routers, modems, and the like connected through wireless links (e.g., radio frequency, satellite) and/or physical links (e.g., fiber optic cable, coaxial cable, Ethernet cable, or a combination thereof). The network 126 can comprise public networks, private networks, wide area networks (e.g., Internet), local area networks, and/or the like. In one aspect, the network 126 can be configured to provide communication from telephone, cellular, modem, and/or other electronic devices to and throughout the system 100. For example, the network 126 can be configured to communicatively couple one or more of a program device 102, merchant device 124, participant device 118, intermediary device 122, and/or the like.

The system 100 can comprise an intermediary device 122. The intermediary device 122 can comprise a device supporting an open-loop payment network. For example, the network 126 can comprise open-loop payment network. The intermediary device 122 can be managed by a third-party intermediary. The intermediary device 122 can be configured to process exchanges (e.g., transactions) between merchants and participants. For example, the intermediary device 122 can be configured to determine whether a requested exchange is covered under a program. The intermediary device 122 can query the program device 102 to determine whether the exchange is authorized under a program. If the exchange qualifies under a program, the intermediary device 122 can receive (e.g., from the program device 102) or otherwise determine an account, sub-account, coupon, voucher, or other asset for use under the program. The intermediary device 122 can determine whether the asset satisfies the exchange. For example, the intermediary device 122 can determine whether an exchange price is less than the value of the asset. If the asset satisfies the exchange, the intermediary device 122 can initiate or otherwise cause transfer of a least a portion of the asset to an account associated with a merchant identifier.

For example, a sub-account of a participant can be linked to an account of the sponsor. The intermediary device 122 can transfer funds from the account of the sponsor to the account of the merchant in order to at least partially satisfy the exchange. As another example, a voucher or coupon to satisfy the exchange can provided by the program device 102 to the intermediary device 122. The voucher or coupon can comprise an account identifier identifying an account or sub-account of the sponsor. The voucher or coupon can specify a percentage of the exchange or provide other instructions for transfer of an asset. The intermediary device 122 can transfer the asset (e.g., funds from the account or sub-account of the sponsor) to the merchant as specified in the voucher or coupon.

As a further example, the intermediary device 122 can receive or otherwise determine portions of the exchange (e.g., specific products) that are to be paid for with specific assets. For example, the program device 102 can identify specific sub-accounts associated with the participant identifier for satisfying purchase of specific products identified in the exchange. Alternatively, the program device 102 can provide the rules 116 to the intermediary device 122, and the intermediary device 122 can determine the sub-accounts based on the rules 116. As an illustration, the intermediary device 122 can receive a request to process an exchange comprising a first product identifier and a second product identifier. The intermediary device 122 can determine (e.g., from the program device 102) that a first product identifier is related to a first sub-account (e.g., wellness program) and the second product identifier is related to a second sub-account (e.g., school supplies program). The intermediary device 122 can transfer funds from the first sub-account for exchange of a first product identifier by the first product identifier. The intermediary device 122 can transfer funds from the second sub-account for exchange of a second product identified by the second product identifier. Any remaining products can be satisfied based on an account identifier provided by the participant. In some cases, a product identifier can be associated with multiple assets, sub-accounts, vouchers, coupons, and/or the like. The intermediary device 122 can be configured to prioritize and/or utilize the multiple assets to satisfy an exchange. The prioritization can be based on the rules 116 of the corresponding program.

The system 100 can comprise a merchant device 124. For example, the merchant device 124 can comprise a computing device, such as a point of sale terminal managed by a merchant. The merchant device 124 can be configured to process an exchange (e.g., transaction) between the merchant and consumers, such as participants of a program. The merchant device 124 can be configured to receive account identifiers 112, participant information 110 (e.g., participant identifiers), product identifiers 108, and/or the like to process an exchange (e.g., with or without a participant device 118). The merchant device 124 can request the intermediary device 122 to authorize, process, complete, and/or the like the exchange. In some scenarios, the merchant device 124 may be configured to additional information from the user, such as a program identifier, sponsor identifier, and/or the like to identify a program in which the participant is enrolled. The merchant device 124 can receive the account identifiers 112, participant information 110 (e.g., participant identifiers), program identifiers, and/or sponsor identifiers from a payment device (e.g., smart phone, smart watch), a payment card (e.g., open-loop payment card, closed loop payment card, program card, rewards card), and/or the like.

In an aspect, the system 100 can comprise a participant device 118. The participant device 118 can be a user device. The participant device 118 can be configured to provide content, services, information, applications, and/or the like to one or more users. For example, the participant device 118 can comprise a computer, a smart device (e.g., smart phone, smart watch, smart glasses, smart apparel, smart accessory), a laptop, a tablet, a set top box, a display device (e.g., television, monitor), digital streaming device, proxy, gateway, transportation device (e.g., on board computer, navigation system, vehicle media center), sensor node, and/or the like. The participant device 118 can comprise a payment device, such as a payment card, smart payment device (e.g., portable and/or smart device with payment capabilities). For example, the participant device 118 can comprise a magnetic strip, microchip, transmitter, radio frequency identifier and/or the like for providing information (e.g., payment information, participant information, program information, payment token, security token) to other devices.

In one aspect, the participant device 118 can comprise an interface element 128 configured to provide an interface to a user to interact with a device, such as the program device 102 or merchant device 124. The interface element 128 can be any interface for presenting and/or receiving information to/from the user, such as user feedback. For example, the interface can be configured to allow a participant to enter participant information, check account balances (e.g., and sub-account balances), determine usage allowance, authorize transactions (e.g., via signature, via fingerprint or other bio-identifier), view transaction details, and/or the like. An example interface can comprise a content viewer, such as a web browser (e.g., Internet Explorer®, Mozilla Firefox®, Google Chrome®, Safari®, or the like), media player, application (e.g., web application, mobile application, media device application), and/or the like. Other software, hardware, and/or interfaces can be used to provide communication between the user and one or more of the participant device 118, the program device 102, and the merchant device 124.

In an aspect, the participant device 118 can comprise a communication element 130. As an example, the communication element 130 can request or query various files from a local source and/or a remote source. As a further example, the communication element 130 can transmit and/or receive data to a local or remote device, such as the program device 102 or the merchant device 124. The communication element 130 can comprise hardware and/or software to facilitate communication. For example, the communication element 130 can comprise one or more of a modem, transceiver (e.g., wireless transceiver)), digital-to-analog converter, analog-to-digital converter, encoder, decoder, modulator, demodulator, tuner, and/or the like. In one aspect, the communication element 130 can be configured to allow one or more remote devices (e.g., in a local or remote portion of the network 126) to control operation of the participant device 118.

In an aspect, the participant device 118 can comprise a tracking element 132. The tracking element 132 can be configured to detect, track, store, and/or the like activity of the participant. The activity of the participant can be stored as activity data. The tracking element 132 can comprise one or more sensors configured to detect activity, such as a heart sensor, sleep sensor, movement sensor, geospatial sensor, and/or the like. The tracking element 132 can detect wellness activities (e.g., running, walking, standing, sitting, sleeping, doctor visit), transportation (e.g., car, public transportation, transportation speed, acceleration, breaking), energy consumption (e.g., home or appliance energy usage), food consumption, location information (e.g., in a study zone, such as library or class room, geospatial coordinates, at a merchant location), purchase information (e.g., product identifiers), and/or the like. The tracking element 132 can send the activity data to the program device 102.

Figure 2:
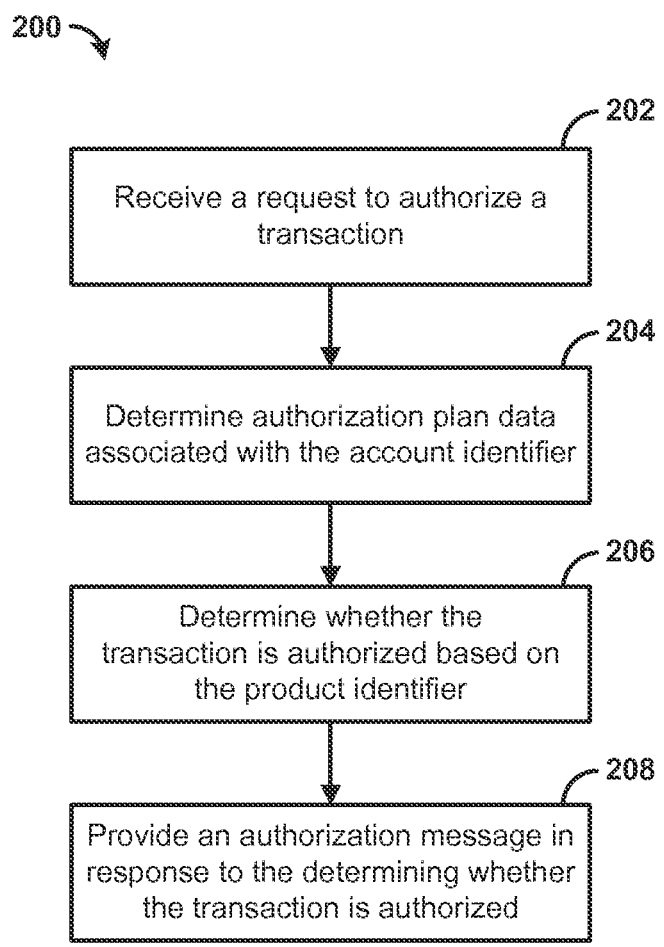
FIG. 2 is a flowchart illustrating an example method for processing data.

FIG. 2 is a flowchart illustrating an example method 200 for processing data. For example, the method 200 can be used for processing a transaction in network, such as payment network, an open loop payment network, a closed loop payment network, and/or the like. At step 202, a request to authorize a transaction can be received. The request can comprise a product identifier and an account identifier. In an aspect, the request can be received from a payment processing server of an open loop processing network. The request can be initiated in response to receiving a payment request from a point of sale device. The account identifier can be received from an open loop payment card.

At step 204, authorization plan data (e.g., program data 104) associated with the account identifier can be determined. The authorization plan data can comprise a collection of product identifiers indicating products authorized by a sponsor. A product is anything that can be purchased, exchanged, or granted, including but not limited to a service, an object, a right, a treatment, a virtual item, and/or the like. The authorization plan data can associate the collection of product identifiers with a program. For example, the program can comprise a program managed by the sponsor. The program can comprise an incentive program, wellness program, a corporate spending program, guardian spending program, and/or the like. The program can comprise a plurality of conditions specifying behaviors and corresponding rewards, permissions, controls, and/or the like. The program can be configured to incentivize a behavior, allow permissible actions or spending, control an outlay (e.g., an amount of money spent on something), and/or the like related to health, spending, education, or a combination thereof. The program can comprise timing constraints. For example, the plurality of conditions can be applicable only for a time period (e.g., specified or defined time period in the program).

In an aspect, an interface (e.g., of the interface element 128) can be provided for the sponsor to define the authorization plan data. The interface can allow the sponsor to specify (e.g., select) products (e.g., product identifiers 108), product categories, and/or the like covered by the program. The interface can be configured to specify merchants (e.g., merchant identifiers 106), categories of merchants, and/or the like for the program. In an aspect, an account indicated by the account identifier (e.g., account identifiers 112) can be funded by the sponsor when a condition is satisfied by a participant of the program associated with the account.

At step 206, it can be determined whether the transaction is authorized based on the product identifier. For example, it can be determined whether the transaction is authorized based on a comparison of the product identifier to at least a portion of the collection of product identifiers (e.g., eligible product identifiers). If the product identifier is a member of the collection of product identifiers (e.g., eligible product identifiers), then the transaction can be authorized. At step 208, an authorization message can be provided (e.g., sent, transmitted) in response to the determining whether the transaction is authorized. The message can be provided to a device from which the request was received. The device can comprise a point of sale device.

In an aspect, the method 200 can comprise determining a sub-account identifier associated with the account identifier. The authorization message authorizes the transaction to redeem a value from a sub-account of the account identified by the sub-account identifier to at least partially satisfy the transaction (e.g., based on rules 116).

In an aspect, the authorization message can authorize a portion of a total transaction cost (e.g., purchase price) to be paid via the account. For example, the user can pay for the remaining portion of the transaction cost via another account, another subaccount, via cash, and/or the like. In another aspect, the authorization message can indicate that certain items are ineligible for payment from the account or subaccount. An ineligible item can comprise a product having a product identifier that does not match any of the identifiers in the collection of product identifiers.

Figure 3:
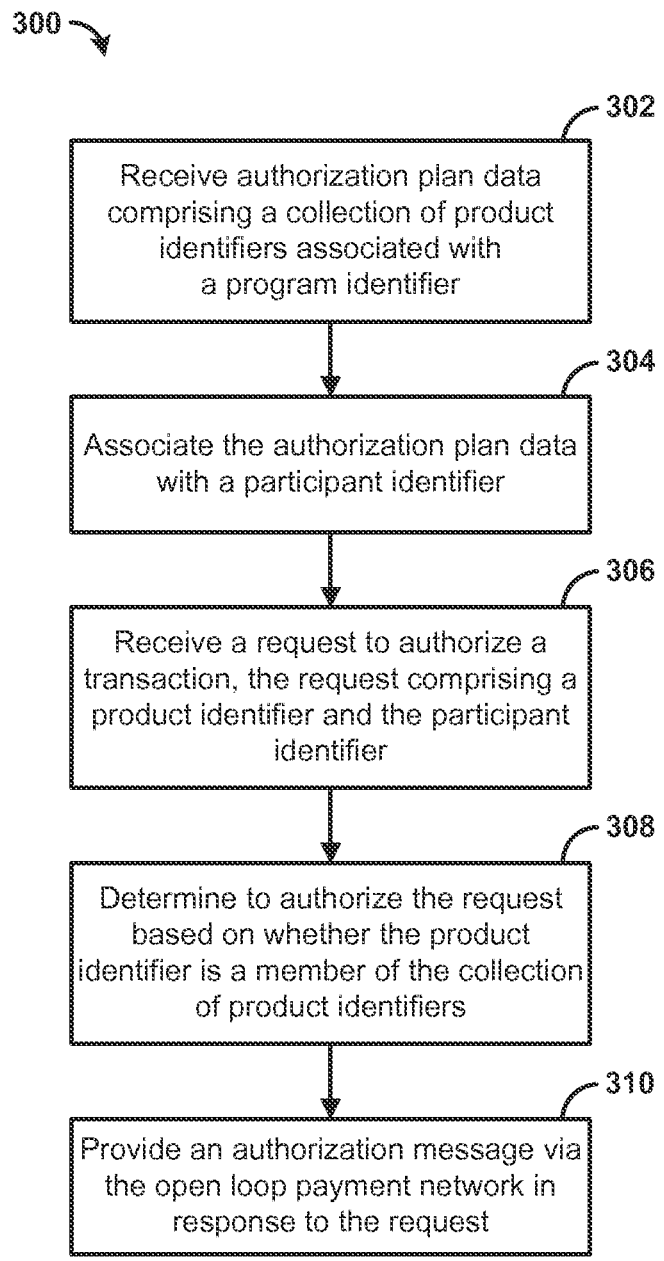
FIG. 3 is a flowchart illustrating an another method for processing data.

FIG. 3 is a flowchart illustrating a method 300 for processing data. For example, the method 300 can be used for managing authorization in a network, such as a payment network, an open loop payment network, a closed loop payment network, and/or the like. At step 302, authorization plan data comprising a collection of product identifiers associated with a program identifier can be received. The authorization plan data can be defined by a sponsor of a program identified by the program identifier (e.g., of program data 104). The sponsor can be an employer of a participant identified by the participant identifier. It should be understood this example is one of many examples. A sponsor can be a parent, health care insurer, government agency, organization, neighborhood association, service provider, and/or the like.

The program identifier can comprise an incentive program identifier. For example, the program identifier can identify a program configured to incentivize a behavior, allow permissible action or spending, and/or the like related to health, spending, education, or a combination thereof, and wherein the program comprises a plurality of conditions specifying behaviors and corresponding rewards, permissions, controls, and/or the like. In an aspect, the program identifier can be associated with a condition for transferring the funds to the account associated with the participant identifier. The condition can comprise an action to be performed to qualify for receipt of the funds. The program can comprise timing constraints. For example, the plurality of conditions can be applicable only for a time period (e.g., specified or defined time period in the program).

In an aspect, the method 300 can further comprise transmitting a message to transfer funds to an account associated with a participant identifier. The message can be transmitted via an open loop payment network, a closed loop payment network, and/or the like. Transmitting a message to transfer funds to or from the account associated with the participant identifier can occur in response to the condition being met.

At step 304, the authorization plan data can be associated with the participant identifier. For example, the participant can be enrolled in the program. An interface can be provided to the participant to allow the participant to opt-in to the program. As another example, the participant can be automatically enrolled into the program in response to a setting or a message from a program administrator.

At step 306, a request to authorize a transaction can be received. The request can comprise the product identifier and the participant identifier. The request can be received by a device managed by the sponsor, at a third party managed authorization server, and/or the like. The request can be received from a payment server, a point of sale device, and/or the like.

At step 308, a determination can be made to authorize the request based on whether the product identifier is a member of the collection of product identifiers. Determining to authorize the request can also be based on a merchant identifier. The request can comprise the merchant identifier. The merchant identifier can identify a merchant offering a transaction to the participant. For example, the authorization plan data can associate the merchant identifier with corresponding product identifiers of the collection of product identifiers. For example, the authorization plan data can associate categories of merchants with corresponding product identifiers of the collection of product identifiers. The method 300 can comprise determining that the condition is met. If the condition is met, then the request can be authorized.

At step 310, an authorization message can be provided via a network in response to the request. The authorization can be provided from the device managed by the sponsor to an authorization server, payment server, and/or point of sale device. For example, the authorization message can be provided via the open loop payment network, the closed loop payment network, and/or the like. In an aspect, the method 300 can comprise transferring at least a portion of the funds from the account to satisfy the transaction in response to providing the authorization message. The funds can be transferred from a sub-account of the account. Additional funds can be transferred from another sub-account, from the account, and/or other source to satisfy the transaction for any products (e.g., services, items) that may be ineligible under the program.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems.

According to a recent Accenture study, 50 million Americans (or 16% of the US population) in 2014 has at least 3 chronic diseases and are responsible for 49% of healthcare spending. Studies indicate this skewing of "the few requiring the most" will only increase in the coming decades.

Employers and health plans are implementing wellness rewards programs and preventative healthcare programs in order to encourage medical adherence and preventative measures to at least contain their members at their current chronic levels and prevent additional members from becoming chronic to at best reduce the number of chronic diseases a member has. These employers and health plans want to reward their members and employees for adopting these positive behaviors.

There is no solution in the market today that allows a program administrator to restrict a purchase by a shopper with an open loop payment card to a select a set of merchandise other than inventory information approval system (IIAS), which restricts spending only for flexible spending accounts (FSAs) and health reimbursement accounts (HRAs) to internal revenue service (IRS) defined eligible health care expenses.

This lack of transparency into what is being purchased creates some challenges to ensure that funds contributed by an employer or health plan to a payment card are used towards products designed to support health and wellness as well as a broader merchandise catalog. In addition, the lack of a solution has negatively impacted our ability to attract new programs to tailor merchandise catalogs to the healthcare industry.

Current reward, or redemption, options are limited and tend to treat all members in a one size fits all manner, e.g., a pair of movie tickets or a $50 gift card to a home improvement store. Other redemption options such as a $50 cash incentive may encourage the wrong behavior if the reward is used for alcohol or cigarettes.

Figure 4:
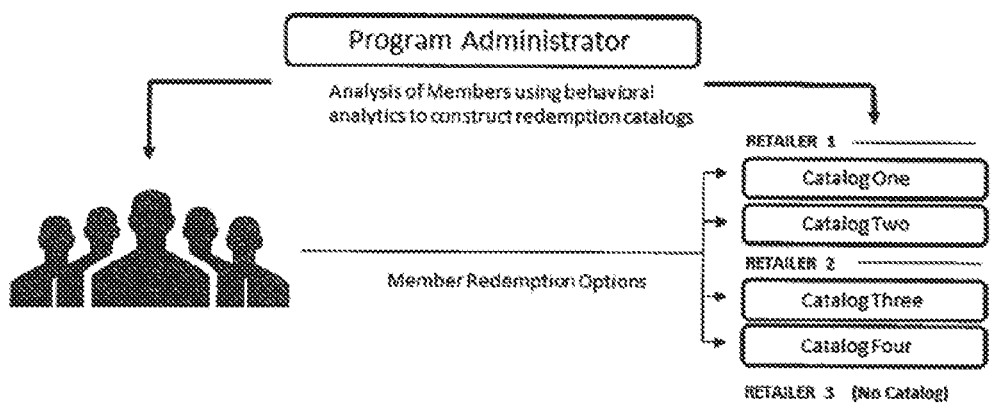
FIG. 4 is a diagram illustrating program administration.

Behavioral scientists have confirmed that in order to get engagement around a program, it must be relevant to the lowest common denominator as possible: a reward, in order to succeed in modifying behavior, must be meaningful in terms of value, timing and relevance to the desired outcome. For example, if a wellness program is targeting a diabetic population, the intent is to communicate the program and reward actions and results the member takes or achieves to reverse the disease or at least slow the severity of the disease. Our solution would allow reward redemption for this type of program to be limited to a defined set of merchandise at defined retailers. Examples of the types of merchandise that might be available in a "diabetic rewards" catalog could be food produce and blood test strips. Another variant of this catalog could be a certain brand of blood test strips and certain exercise equipment as determined by the plan administrator. As shown in FIG. 4, plan administrators, or their designee, could work with manufacturers or retailers to construct these catalogs and using the behavioral analytics of these populations, change the contents of the catalogs from time to time to improve and increase member adoption and improve outcomes for these various types of programs.

There are no automated processing solutions for transactions that occur at non-IIAS certified merchants. While FSA and HRA products are limited to provider care fees and IIAS merchants, other less restricted products may be used a wide range of merchants. Hence, the burden to ensure that eligible merchandise is being purchased falls directly on the member and the program administrator. And, in cases where the member has incentive dollars banked in an account or purse, plan administers have no ability to control how the dollars are spent.

Accordingly, the present methods and systems comprise an automated transaction authorization approach that would enable a third-party to approve and auto-substantiate purchases from eligible merchants and defined merchandise catalogs from ecommerce and brick and mortar retailers.

Plan administrators work with a third party to define a redemption program through merchants offering health and wellness related items. Members would shop and use their benefit card product at select merchants or at a customized merchant catalog. At the point of sale (POS), the merchant would seek an approval from the issuing bank by passing a one or more unique identifiers (e.g., merchant ID, terminal ID, catalog ID, etc.) or combination of identifiers to the third party to validate the card, eligible dollars, and decision the purchase. In addition, the present methods and systems allow for the auto-substantiation of the transaction according the program as defined by the health plan, Employer or plan administrator.

Figure 5:
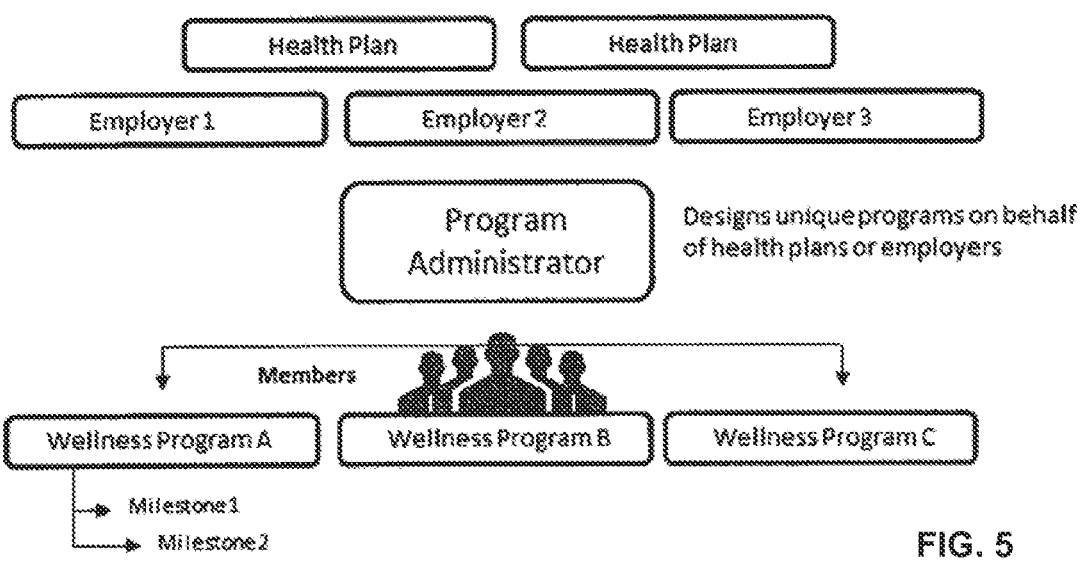
FIG. 5 is a diagram illustrating administration of multiple wellness programs.
Figure 6:
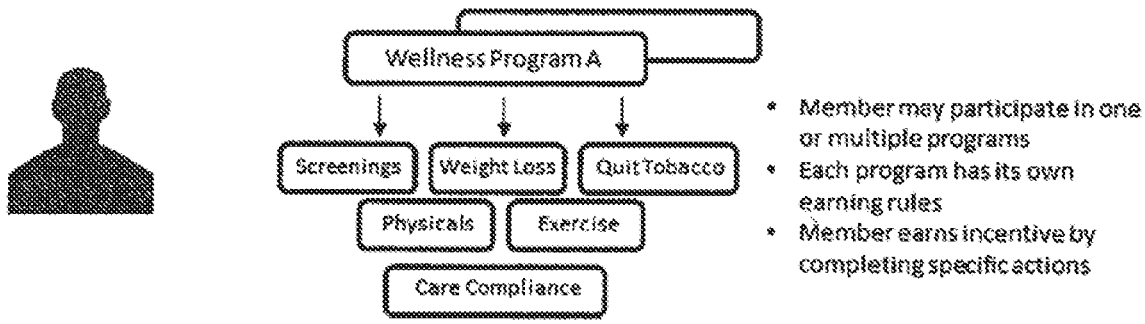
FIG. 6 is a diagram illustrating wellness programs.

In an aspect, a program administrator, on behalf of a health plan, an employer or group of health plans or employers, defines a wellness program intended to produce desired results in its members. As shown in FIG. 5, the program administrator may design varying wellness programs based on a variety of behaviors it wishes to modify in its membership and the program administrator may design varying milestones within each wellness program to influence the behaviors in its membership. A member can perform a rewardable action or attain a rewardable result as defined by the wellness program. As shown in FIG. 6, a Member may participate in one or multiple wellness programs.

Figure 7:
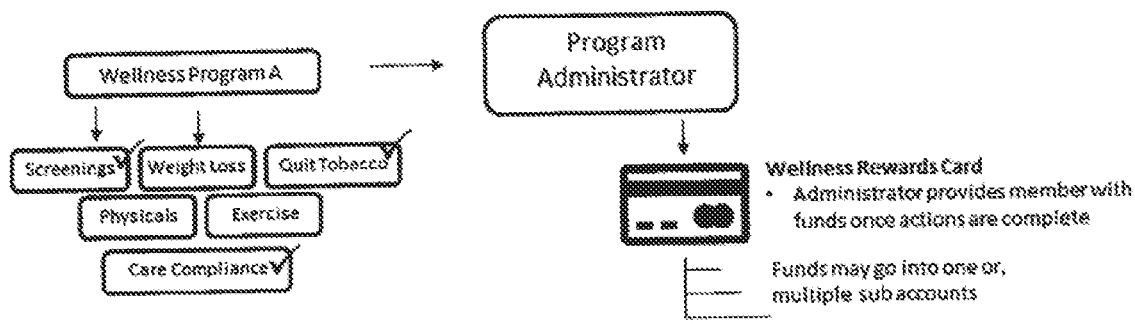
FIG. 7 is a diagram illustrating the use of a wellness rewards card.
Figure 9:
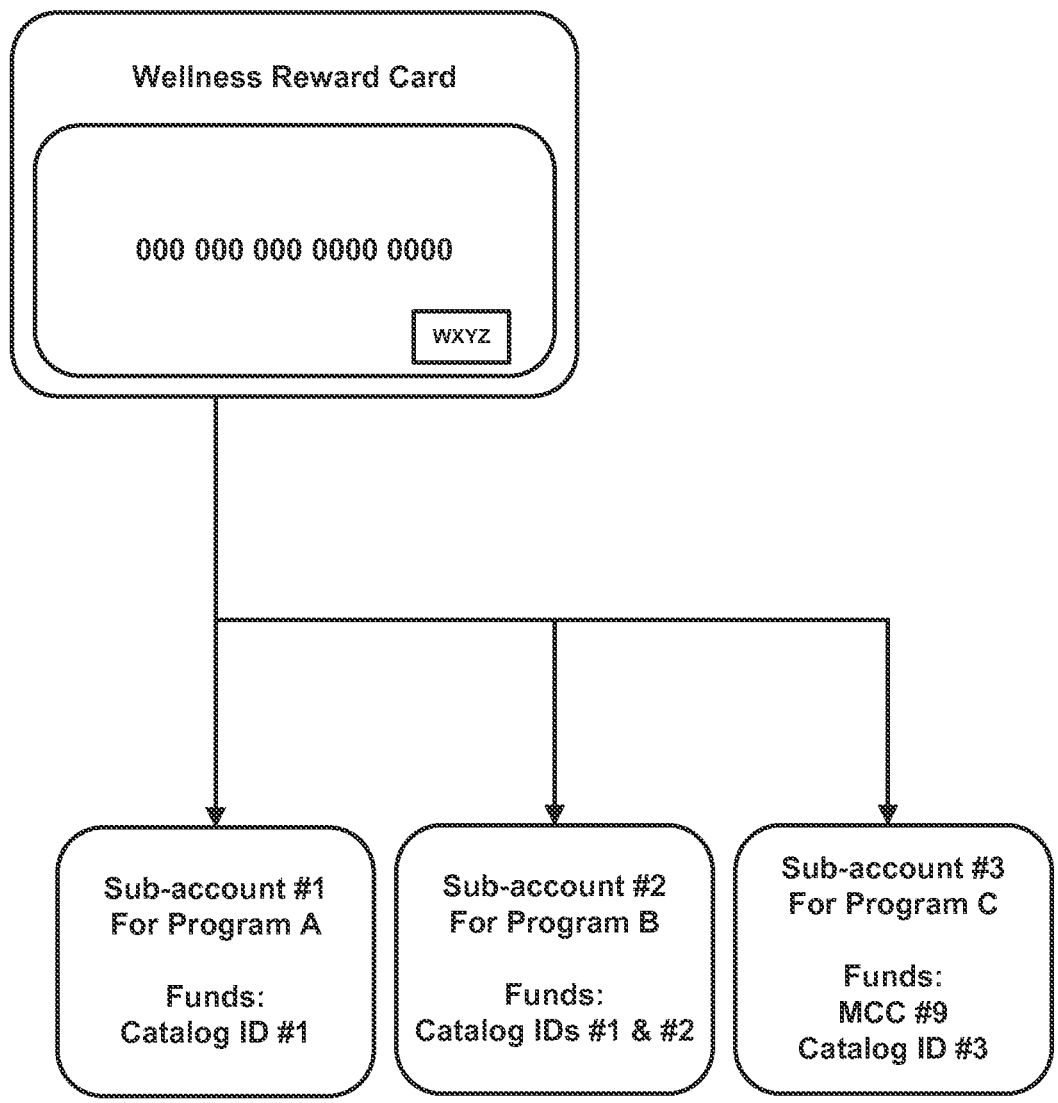
FIG. 9 is a diagram illustrating the use of sub-accounts.

The program administrator can provide the member with funds (either once or in an ongoing manner as program objectives are achieved) loaded onto a payment card supporting ATA functionality. The program administrator may provide funds into one sub-account on the payment card allowing the member to use the funds. As shown in FIG. 7 and FIG. 9, the program administrator may provide funds into more than one sub-account on the payment card allowing the member to use only certain funds in each sub-account for certain catalogues.

Figure 8:
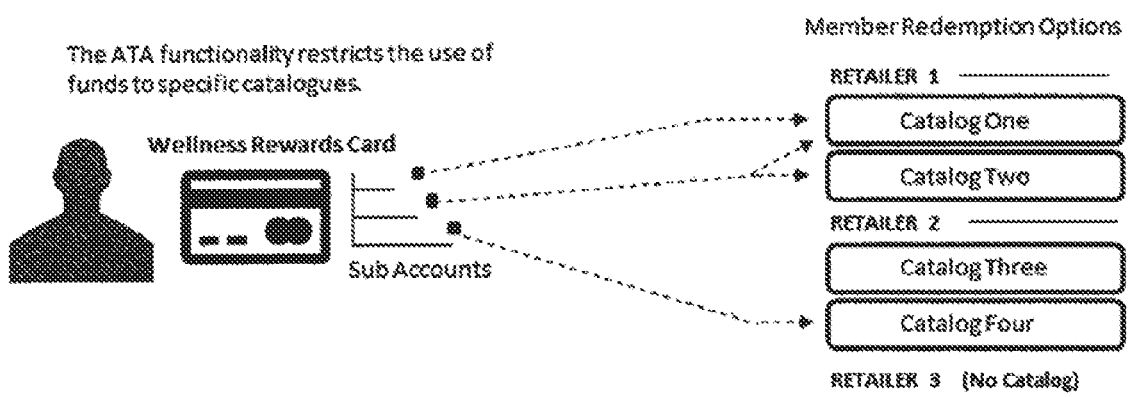
FIG. 8 is a diagram illustrating restriction of funds to specific catalogs.

In an aspect, ATA functionality can restrict use of funds to catalogue(s) of goods or services the program administrator has defined as eligible for a wellness program. The program administrator can construct a catalogue of one good or service for which the funds can be used. The program administrator can construct a catalogue of multiple goods or services for which the funds can be used. The program Administrator can construct multiple catalogues containing one good or service. The program administrator can construct multiple catalogues containing multiple goods or services. As shown in FIG. 8, the program administrator can construct multiple catalogues containing one good or services and multiple goods or services.

A catalogue may comprise goods or services defined individually or in combination of specific or general merchant category code, specific or general merchant ID or number, specific or general terminal ID or number, specific or general acquirer ID or number, other unique identifier passed in the system messages between the catalog and payment card.

Figure 10:
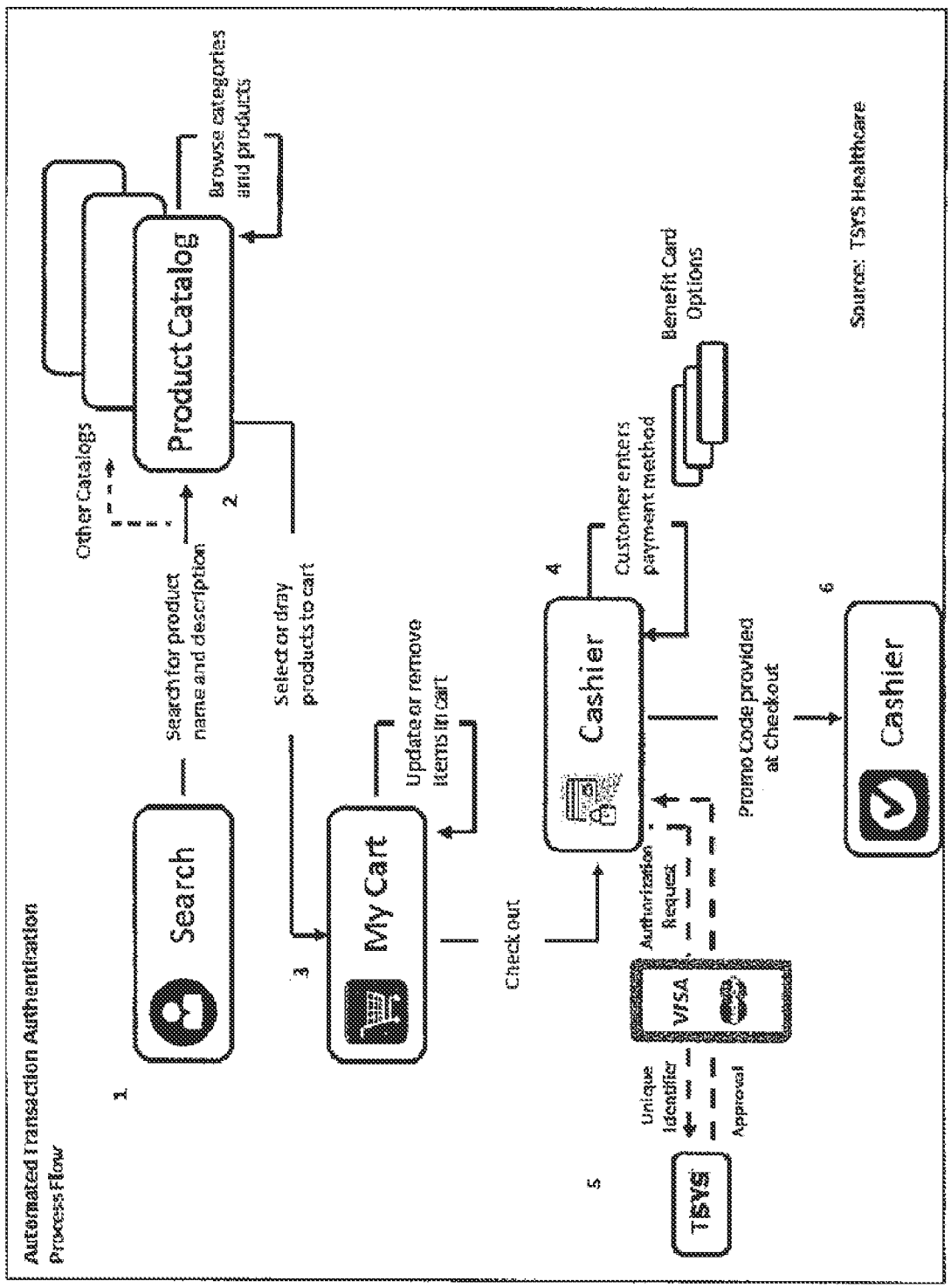
FIG. 10 is a diagram illustrating a process for authorizing items under a program.

The catalogue provider may only accept payment cards with enabled ATA functionality. The payment card provider may authorize only transactions which meet the criteria defined by the Program Administrator. In the event a transaction matches multiple sub-accounts the Program Administrator can configure sub-account debit logic to deduct funds from higher priority purses before and in addition to lower priority purses which may also improve the Member experience. FIG. 10 an example process flow for authorizing transaction based on programs.

Figure 11:
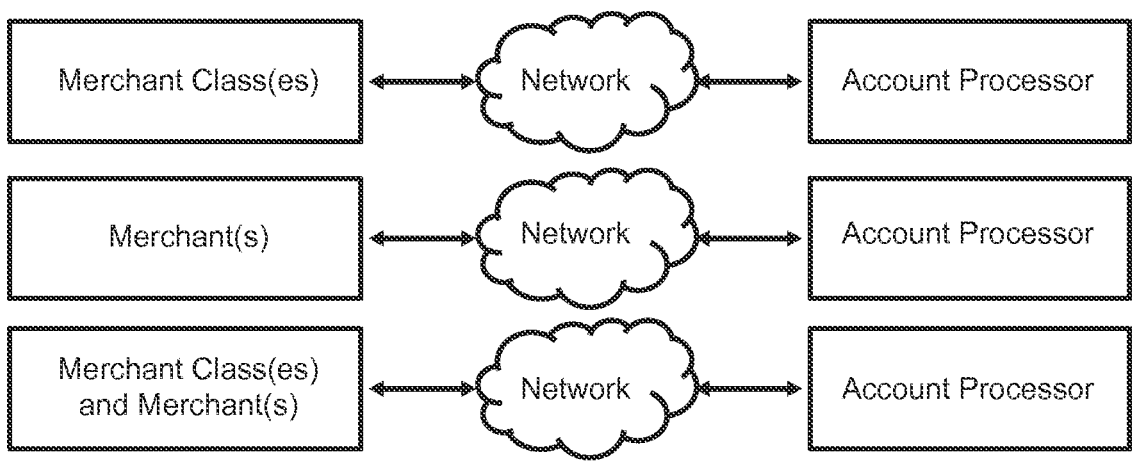
FIG. 11 is a diagram illustrating an example exchange of information between a merchant and an account processor.

FIG. 11 is a diagram illustrating an example exchange of information between a merchant and an account processor. For example, a merchant can provide a request to authorize an exchange (e.g., transaction) from a merchant. The merchant can provide one or more merchant class, one or more merchant identifier, or a combination thereof. For example, a merchant identifier can identify a specific merchant and/or merchant location. A merchant class can identify a type of merchant, such as a grocer, automotive sales, educational institution, health care provider, pharmacy, and/or the like.

Figure 12:
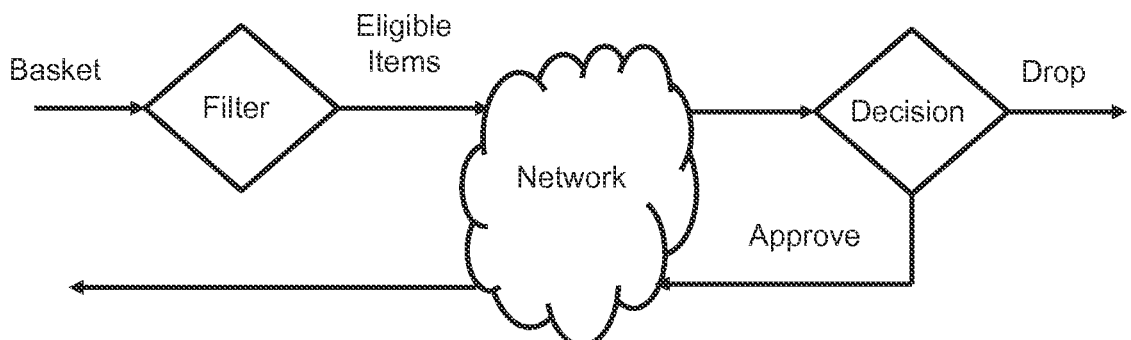
FIG. 12 is a diagram illustrating an example process flow.

FIG. 12 is a diagram illustrating an example process flow. As shown, a participant can fill an electronic or physical basket with product items (e.g., product identifiers). An item (e.g., product) can comprise a good or service that can be uniquely identified and that is sold or provided by one or more merchants. A device, such as the merchant device 124 or intermediary device 122, can filter the items in the basket by comparing (e.g., matching) the items to items in a catalog. Then the remaining items (e.g., the ones that matched) can be send to another device (e.g., program device 102) for approval or denial.

Figure 13:
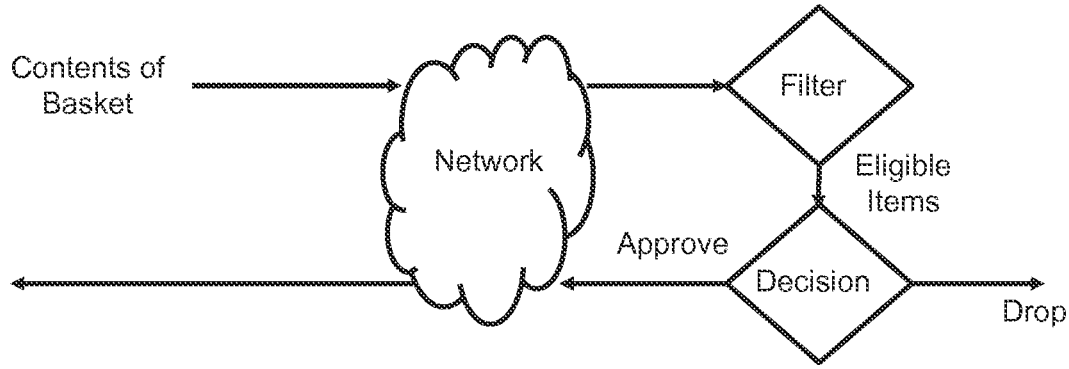
FIG. 13 is a diagram illustrating an another example process flow.

FIG. 13 is a diagram illustrating an example process flow. As shown, a participant can fill an electronic or physical basket with product items (e.g., product identifiers). All the items in the basket can be provided to another device, such as the program device 102. The receiving device can filter the items in the basket by comparing (e.g., matching) the items to items in a catalog. Then, the device can determine whether to approve or deny the transaction.

Figure 14:
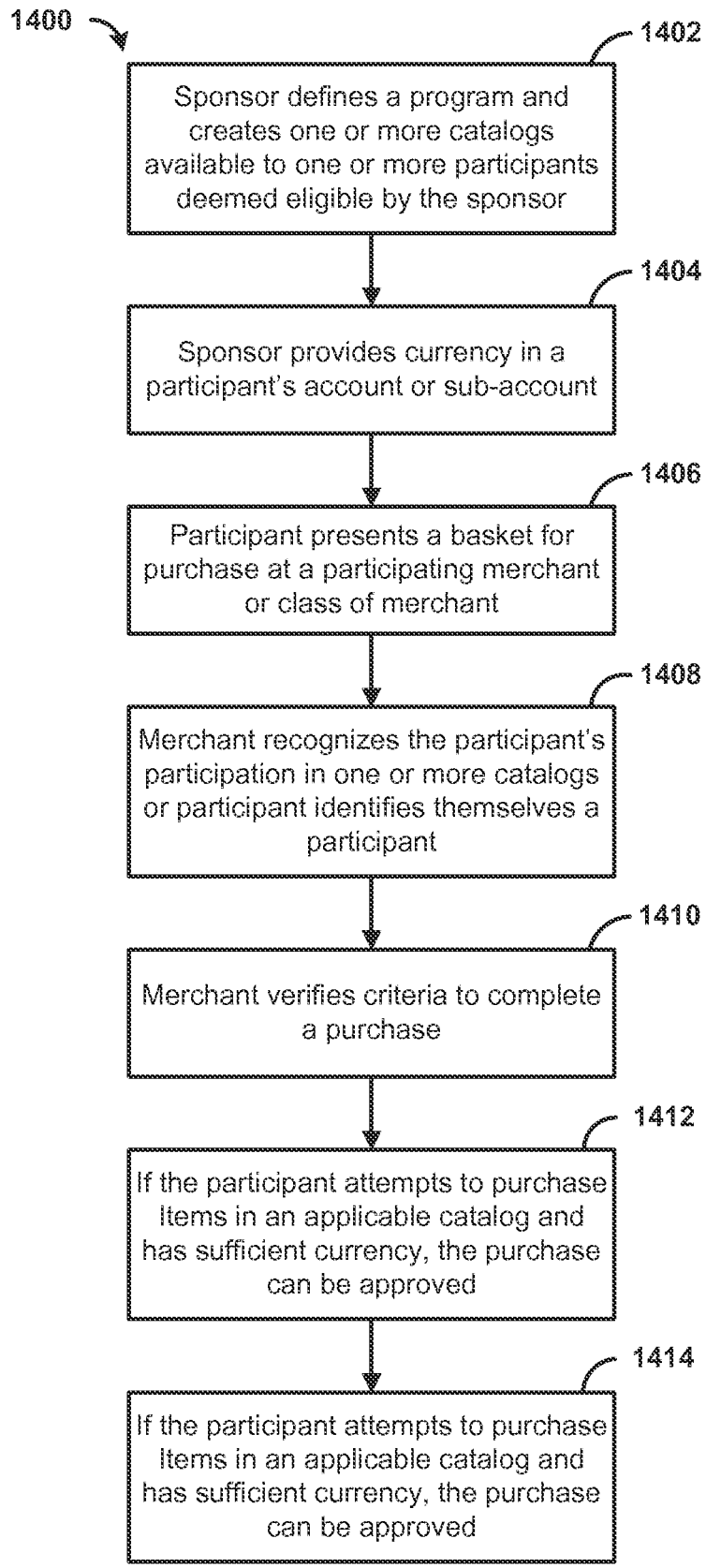
FIG. 14 is a flowchart illustrating a method for processing a request to authorize payment from an account.

FIG. 14 is a flowchart illustrating a method for processing a request to authorize payment from an account. At step 1402, a sponsor can define a program and creates one or more catalogs (e.g., authorization plan data) available to one or more participants deemed eligible by the sponsor. A program can be defined by a sponsor or their designee for a prospective participant's eligibility in the program, catalog availability for eligible participants and purchase rules from a catalog. A catalog can comprise a collection of one or more items or one or more class of merchants created by or on behalf of a sponsor and made available for purchase by one or more participants. A participant can comprise an individual who buys goods or services using a sponsor's currency. A class of merchant (e.g., category of merchant) can comprise a types of merchants that sell or provide similar goods or services (e.g., general retailers, airlines, hotels, doctors, pharmacies, auto repair shops, etc.) or grouping of one or more chains of merchants. A merchant can comprise an individual or enterprise that sells items through one or more brick and mortar locations or through on-line or e-commerce channels. In an aspect, it can be implemented in a closed loop environment. In another aspect, it can be used in an open loop environment with MCC, merchant ID and/or terminal ID restrictions.

At step 1404, the sponsor can provide currency in a participant's account or sub-account. A sub-account can comprise a singular financial debit or credit instrument with a currency that may be segmented from other sub-accounts due to differing sponsors, catalogs, available currency, participants, types of sub-accounts. The funds can be in the account/sub-account or our technology can access funds that are not "in the account/sub-account" (e.g., switch the transaction to another system). In another aspect, a redemption voucher can be used. The redemption voucher can allow the participant to purchase a specific item (e.g., a flu shot) regardless of purchase price. A purchase can comprise a transaction that results in an exchange of currency from a participant's account or sub-account. In another aspect, a discount can be determined at the POS or a request for a discount can be authorized based on a program. At step 1406, a participant can present a basket for purchase at a participating merchant or class of merchant. A basket can comprise one or more items a participant has selected from a merchant or class of merchants.

At step 1408, a merchant can recognize the participant's participation in one or more catalogs or participant identifies themselves a participant. The merchant must be able to discern that a card/item combination is valid. The merchant can have a database of account numbers/ranges/BINs or other information that is in the mag stripe/chip that can be used to restrict purchases to certain items/catalogs and only send matching combinations for authorization to the processor for decisioning the purchase. In an aspect, the merchant can add the SKU/Catalog ID to the auth/transaction so the processor can validate the SKU/Catalog ID to a purse. Processor must have a SKU/Catalog ID to purse cross-reference.

At step 1410, the merchant or sponsor can verify that the items in the participant's basket are in one or more catalogs available to that participant within a valid time boundary and that the participant meets resource requirements and other criteria to complete the purchase. A time boundary can comprise a start and finish for a program, catalog, and/or purchase to be in force. For example, a time boundary can be always, never, a specific time, a specific date or combination of date and time to define a start or a finish. For example, the participant has sufficient funds available in one or more of the participant's accounts or sub-accounts.

At step 1412, if the participant attempts to purchase items in an applicable catalog and has sufficient currency, the purchase can be approved and the appropriate currency can be deducted or removed from the applicable participant's account or sub-account for the value of the items. Currency (e.g., asset) can comprise a denomination consisting of one or more of the following: monetary funds, points, credits, vouchers or discounts. In a card scenario, the merchant can route the authorization to a party/device (e.g., intermediary device 122) for decisioning.

At step 1414, if the participant attempts to purchase items that are not in an applicable catalog for that participant or has insufficient currency in applicable accounts or sub-accounts, the merchant does not sell the items to the participant but may accept another form of payment for these items. In an aspect, split tenders and alternate payment instruments can be accounted for to conclude the transaction.

In an aspect, a variety of programs can be implemented as described further below. For example, a program can comprise a wellness program. The program can have a sponsor that provides and/or manages a health plan. A participant of the program can comprise a member of the health plan. As an illustration, the participant can have newborn. The program can comprise and/or specify a reward. The sponsor can create a catalog comprising items related to newborns, such as formula (e.g., specific SKU #), diapers (e.g., collection of SKU #s), doctors' offices (e.g., specific MCC), shots, and/or the like. For example, the sponsor can also define, specify, and/or publish a wellness program that rewards new mothers for shots for their newborn children, called the "New Mommy" program. The participant can actively or passively enroll in New Mommy program (e.g., program is either opt-in or opt-out). As another example, the participant can be auto enrolled.

When the participant gets shots for a newborn, the participant can be rewarded by receiving currency in a newborn wellness program purse. For example, a specified reward amount (e.g., $50) can be transferred from the sponsor's account in to a "New Mommy program" purse associated with the participant. The participant can redeem reward by an item in the catalog, such as diapers or formula.

In an aspect, a health plan may have multiple wellness programs. Members can participate in multiple programs (e.g., New Mommy program above and a diabetic program). Currency can be separated by purse. Wellness programs can vary by member type.

In another aspect, a wellness program can use vouchers as a reward. The sponsor can create a catalog comprising vaccines, such as vaccines related to newborns (e.g., Hepatitis B vaccine). The sponsor can define, specify, and/or publish a wellness program that indicates that newborns receive free Hepatitis B vaccines. The participant actively or passively enrolls in Hepatitis B Vaccine program (e.g., program is either opt-in or opt-out). Sponsor puts unique code for Hepatitis B vaccines in "Hepatitis B vaccine" purse on participant's Account. The participant goes to participating merchant (e.g., doctor) to get Hepatitis B vaccine for newborn. Participant redeems voucher for vaccine. The merchant sends an authorization message comprising a unique code for Hepatitis B vaccine (above) and MCC. We authorize transaction based on purse availability, MCC, account status, etc.

In another aspect, a wellness program can use discounts as a reward. The sponsor can create a catalog comprising a discount for a healthy activity. For example, the discount can comprise a 25% discount for a gym or chain of gyms (e.g., MCC=7997/7999). The Sponsor publishes wellness program "Fitness Discounts." The participant actively or passively enrolls in Fitness Discounts program (e.g., the program can be either opt-in or opt-out). The sponsor opens "Fitness Discounts" purse on participant's Account. The participant goes to the gym. The discount can be validated in a variety of ways. For example, merchant filtering can be implemented. When the participant goes to the gym, the participant (e.g., or gym employee) can swipe a card having an account. The account number can be used to determine that participant is a member of the discount program. For example, the gym can maintain a database of participating account numbers and be PCI compliant.

In another aspect, sponsor validation can be implemented. The gym can send authorization request to a third party. The authorization request can comprise the gym location's merchant ID (MID) and the participant's account information (e.g., account number). The third party can maintain a MID listing for relevant gyms that are part of the gym chain. The third party can authorize the transaction based on purse availability (e.g., if purse exists, discount is available), account status, etc. and either return approval or decline. Then, the gym can ask for another form of payment to complete purchase.

In an aspect, discounts can be used in conjunction with rewards. When Sponsor opens the "Fitness Discount" purse it may be funded with $50 and the gym may apply discount before sending the transaction to the third party. The party can store the discount percentage and receive full transaction amount. The discount can be applied and the discount amount can authorize the discounted amount against funds in purse.

In another aspect, an example system can use any combination of rewards, vouchers, discounts including multiple rewards, discounts, and/or vouchers for one or more participants and one or more sponsors. A single transaction can be related to a health plan with corresponding programs. Funding can come from multiple entities, such as a health plan sponsor or a manufacturer (e.g., maker of infant formula). The sponsor can control the program.

In an aspect, an example program can comprise a supplies program. For example, the supplies can comprise office supplies, school supplies, and/or the like. Transactions related to program can comprise a business account card, student account card, a personal account card, and/or the like. A sponsor of the supplies program can comprise company, education institution, scholarship entity, and/or the like. The participant can comprise an employee or student of the sponsor. The sponsor can creates a first catalog comprising Mead notebooks and BIC pens.

The sponsor can create a second catalog for restaurants (e.g., for ordering in lunch based on certain merchant IDs, like a sandwich shop). The sponsor can transfer funds in to an office supply purse. The participant buys only appropriate office supplies (e.g., those in the first catalog). The sponsor links restaurant purse to corporate working capital DDA. The participant orders lunch and authorization matches restaurant MCC (e.g., or MID if sandwich shop chain) and is below threshold so is switched to DDA for approval. As another example, the company may have designated employees with varying limits. A restaurant may sell or make available MID lists to encourage spending.

In an aspect, an example program can comprise a disaster relief program. In a disaster relief program can provide rewards, discounts, vouchers, and/or the like for certain MCCs, such as hotels and restaurants. The disaster relief program can provide can provide rewards, discounts, vouchers for certain materials at home improvement store and similar merchants.

In an aspect, an example program can comprise a guardian program, such as a parent-child program. The guardian program can provide rewards, discounts, vouchers for all gas purchases, food purchases, and/or the like. The guardian program can prohibit purchase of items such as glue, alcohol, tobacco or firearms (e.g., from select merchants).

In an aspect, an example program can comprise a fleet program. The fleet program can provide rewards, discounts, vouchers for a catalog of items at one merchant that varies by sponsor. The fleet program can provide rewards, discounts, vouchers for a catalog of Items at multiple merchant chains that are the same across all programs. For example, the fleet program can specify discounts for Michelin tires purchased at one merchant chain, multiple merchant chains or all merchant chains participating in the program.

Figure 15:
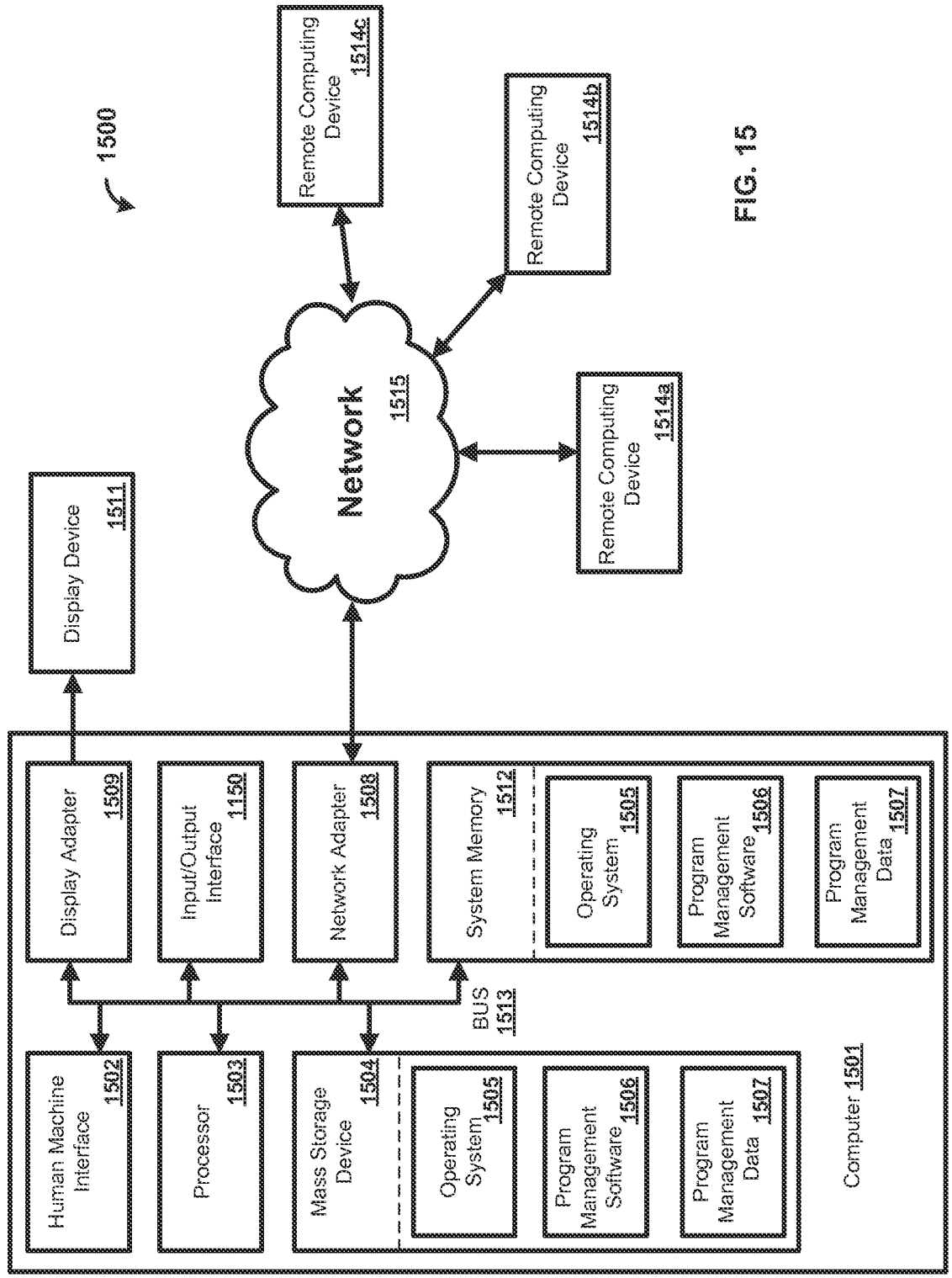
FIG. 15 is a block diagram illustrating an example computing device in which the present methods and systems can operate.

In an exemplary aspect, the methods and systems can be implemented on a computer 1501 as illustrated in FIG. 15 and described below. By way of example, program device 102, intermediary device 122, participant device 118, and the merchant device 124 of FIG. 1 can be computers as illustrated in FIG. 15. Similarly, the methods and systems disclosed can utilize one or more computers to perform one or more functions in one or more locations. FIG. 15 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1501. The components of the computer 1501 can comprise, but are not limited to, one or more processors 1503, a system memory 1512, and a system bus 1513 that couples various system components including the one or more processors 1503 to the system memory 1512. The system can utilize parallel computing.

The system bus 1513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1513, and all buses specified in this description can also be implemented over a wired or wireless network connection and each of the subsystems, including the one or more processors 1503, a mass storage device 1504, an operating system 1505, program management software 1506, program management data 1507, a network adapter 1508, the system memory 1512, an Input/Output Interface 1510, a display adapter 1509, a display device 1511, and a human machine interface 1502, can be contained within one or more remote computing devices 1514a,b,c at physically separate locations, connected through buses of this form, in effect implementing a fully distributed system.

The computer 1501 typically comprises a variety of computer readable media. Exemplary readable media can be any available media that is accessible by the computer 1501 and comprises, for example and not meant to be limiting, both volatile and non-volatile media, removable and non-removable media. The system memory 1512 comprises computer readable media in the form of volatile memory, such as random access memory (RAM), and/or non-volatile memory, such as read only memory (ROM). The system memory 1512 typically contains data such as the program management data 1507 and/or program modules such as the operating system 1505 and the program management software 1506 that are immediately accessible to and/or are presently operated on by the one or more processors 1503.

In another aspect, the computer 1501 can also comprise other removable/non-removable, volatile/non-volatile computer storage media. By way of example, FIG. 15 illustrates the mass storage device 1504 which can provide non-volatile storage of computer code, computer readable instructions, data structures, program modules, and other data for the computer 1501. For example and not meant to be limiting, the mass storage device 1504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1504, including by way of example, the operating system 1505 and the program management software 1506. Each of the operating system 1505 and the program management software 1506 (or some combination thereof) can comprise elements of the programming and the program management software 1506. The program management data 1507 can also be stored on the mass storage device 1504. The program management data 1507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1503 via the human machine interface 1502 that is coupled to the system bus 1513, but can be connected by other interface and bus structures, such as a parallel port, game port, an IEEE 1394 Port (also known as a Firewire port), a serial port, or a universal serial bus (USB).

In yet another aspect, the display device 1511 can also be connected to the system bus 1513 via an interface, such as the display adapter 1509. It is contemplated that the computer 1501 can have more than one display adapter 1509 and the computer 1501 can have more than one display device 1511. For example, the display device 1511 can be a monitor, an LCD (Liquid Crystal Display), or a projector. In addition to the display device 1511, other output peripheral devices can comprise components such as speakers (not shown) and a printer (not shown) which can be connected to the computer 1501 via the Input/Output Interface 1510. Any step and/or result of the methods can be output in any form to an output device. Such output can be any form of visual representation, including, but not limited to, textual, graphical, animation, audio, tactile, and the like. The display device 1511 and computer 1501 can be part of one device, or separate devices.

The computer 1501 can operate in a networked environment using logical connections to one or more remote computing devices 1514a,b,c. By way of example, a remote computing device can be a personal computer, portable computer, smartphone, a server, a router, a network computer, a peer device or other common network node, and so on. Logical connections between the computer 1501 and a remote computing device 1514a,b,c can be made via a network 1515, such as a local area network (LAN) and/or a general wide area network (WAN). Such network connections can be through the network adapter 1508. The network adapter 1508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1505 are illustrated herein as discrete blocks, although it is recognized that such programs and components reside at various times in different storage components of the computing device 1501, and are executed by the one or more processors 1503 of the computer. An implementation of the program management software 1506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, by a network device via a merchant point of sale device, data indicative of an authorization request for a payment card transaction, wherein the data indicative of the authorization request comprises a product identifier, a merchant identifier, and an account identifier, and wherein the account identifier is associated with at least one of; an open loop payment card or an open loop payment device;
    determining, based on the account identifier and program data for a sponsor program stored at the network device, that the account identifier is associated with the sponsor program, wherein the program data comprises a set of rules for authorizing payment card transactions comprising one of a plurality of authorized merchant identifiers and at least one of a plurality of authorized product identifiers;
    determining, based on the set of rules, that the product identifier is among the plurality of authorized product identifiers and the merchant identifier is among the plurality of authorized merchant identifiers;
    determining, based on the product identifier being among the plurality of authorized product identifiers and the merchant identifier being, among the plurality of authorized merchant identifiers, that the payment card transaction is authorized;
    providing, based on the payment card transaction being authorized, an authorization message to the merchant point of sale device; and
    causing, based on the payment card transaction being authorized, a transfer of funds from an account associated with the sponsor program to an account associated with the account identifier.

2. The method of claim 1, wherein the program data further comprises a plurality of conditions associated with one or more behaviors and one or more rewards associated with the one or more behaviors.

3. The method of claim 2, wherein the one or more behaviors are further associated with one or more of health, spending, or education.

4. The method of claim 1, wherein the account identifier identifies an account that is funded by a sponsor associated with the sponsor program when a condition is satisfied by a participant of the sponsor program.

5. The method of claim 1, wherein the authorization request is received responsive to receiving, from the merchant point of sale device, a payment request associated with the payment card transaction.

6. The method of claim 1, further comprising receiving, via an interface, the program data for the sponsor program.

7. The method of claim 1, wherein the network device comprises an intermediary device associated with an open-loop payment network.

8. The method of claim 1, further comprising determining, based on the account identifier, a sub-account, wherein the authorization message authorizes redeeming a value from the sub-account, wherein causing the transfer of the funds comprises causing the transfer of the funds to satisfy a portion of the payment card transaction.

9. A method comprising:
    receiving, by a network device, program data for a sponsor program, wherein the program data comprises a plurality of participant identifiers and a set of rules for determining whether payment card transactions comprise one of a plurality of authorized merchant identifiers and at least one of a plurality or authorized product identifiers;
    storing the program data in a memory of the network device;
    receiving, from a merchant point of sale device, data indicative of a request to authorize a payment card transaction, wherein the request comprises a product identifier, a merchant identifier, and a participant identifier, wherein the merchant point of at least one of: an open loop payment card or an open loop payment device;
    determining, based on the program data and the set of rules, that the product identifier is among the plurality of authorized product identifiers, the participant identifier is among the plurality of participant identifiers, and the merchant identifier is among the plurality of authorized merchant identifiers;
    authorizing the payment card transaction based on the participant identifier being among the plurality of participant identifiers, the product identifier being among the plurality of authorized product identifiers, and the merchant identifier being among, the plurality of authorized merchant identifiers;
    providing, based on authorizing the payment card transaction, an authorization message to the merchant point of sale device; and
    causing, based on the payment card transaction being authorized, a transfer of funds from an account associated with the sponsor program to an account associated with the participant identifier.

10. The method of claim 9, wherein the network device comprises an intermediary device associated with an open-loop payment network, and wherein causing the transfer of the funds comprises causing, by the intermediary device, the transfer of the funds via the open loop payment network.

11. The method of claim 10, wherein the program data further comprises a condition for transferring the funds to the account associated with the participant identifier, wherein satisfying the condition comprises performing an action associated with the sponsor program.

12. The method of claim 11, wherein causing the transfer of the funds further comprises determining that the condition is satisfied.

13. The method of claim 10, wherein causing the transfer of the funds comprises causing a transfer of at least a portion of the funds from the account associated with the sponsor program to satisfy the payment card transaction.

14. The method of claim 9, wherein the sponsor program is associated with an employer of a participant identified by the participant identifier.

15. The method of claim 9, wherein the program data further comprises an association between the merchant identifier and a first product identifier of the plurality of authorized product identifiers, wherein authorizing the payment card transaction is further based on the merchant identifier being associated with the first product identifier.

16. The method of claim 9, wherein the sponsor program comprises a plurality of conditions associated with one or more behaviors and one or more rewards associated with the one or more behaviors, wherein the one or more behaviors are further associated with one or more of health, spending, or education.

17. An apparatus, comprising:
 one or more processors; and
 memory having embodied thereon processor executable instructions that, when executed by the one or more processors, cause the apparatus to:
  receive, via a merchant point of sale device, data indicative of an authorization request for a payment card transaction, wherein the data indicative of the authorization request comprises a product identifier, a merchant identifier, and an account identifier, and wherein the account identifier is associated with at least one of: an open loop payment card or an open loop payment device;
  determine, based on the account identifier and program data for a sponsor program, that the account identifier is associated with the sponsor program, wherein the program data comprises a set of rules for authorizing payment card transactions comprising one of a plurality of authorized merchant identifiers and at least one of a plurality of authorized product identifiers;
  determine, based on the set of rules, that the product identifier is among the plurality of authorized product identifiers and the merchant identifier is among the plurality of authorized merchant identifiers;
  determine, based on the product identifier being among the plurality of authorized product identifiers and the merchant identifier being among the plurality of authorized merchant identifiers, that the payment card transaction is authorized;
  provide, based on the payment card transaction being authorized, an authorization message to the merchant point of sale device, wherein providing the authorization message causes a transfer of funds; and
  cause, based on the payment card transaction being authorized, a transfer of funds from an account associated with the sponsor program to an account associated with the account identifier.

18. The apparatus of claim 17, wherein the account associated with the account identifier is funded based on satisfying a condition defined by the program data and the set of rules.

19. The apparatus of claim 18, wherein satisfying the condition comprises a participant of the sponsor program satisfying the condition.

20. The apparatus of claim 17, wherein the data indicative of the authorization request is received responsive to receiving, from the merchant point of sale device, a payment request associated with the payment card transaction.

* * * * *